(12) United States Patent
Tomioka

(10) Patent No.: US 11,729,320 B2
(45) Date of Patent: Aug. 15, 2023

(54) SYSTEM, AND IMAGE PROCESSING APPARATUS

(71) Applicant: CANON KABUSHIKI KAISHA, Tokyo (JP)

(72) Inventor: Yu Tomioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/411,995

(22) Filed: Aug. 25, 2021

(65) Prior Publication Data

US 2022/0070310 A1    Mar. 3, 2022

(30) Foreign Application Priority Data

Aug. 31, 2020   (JP) ................................. 2020-145987

(51) Int. Cl.
| | | |
|---|---|---|
| *H04N 1/00* | (2006.01) | |
| *H04N 1/04* | (2006.01) | |
| *H04L 9/40* | (2022.01) | |
| *G06Q 10/1093* | (2023.01) | |
| *G06Q 50/20* | (2012.01) | |

(52) U.S. Cl.
CPC ......... *H04N 1/00344* (2013.01); *H04L 63/08* (2013.01); *H04N 1/00209* (2013.01); *H04N 1/00244* (2013.01); *H04N 1/00411* (2013.01); *H04N 1/04* (2013.01); *G06Q 10/1093* (2013.01); *G06Q 50/205* (2013.01)

(58) Field of Classification Search
None
See application file for complete search history.

(56) References Cited

U.S. PATENT DOCUMENTS

| | | | |
|---|---|---|---|
| 2008/0091735 A1* | 4/2008 | Fukushima | ........... G06F 21/645 |
| 2015/0118672 A1 | 4/2015 | Yeskel et al. | |
| 2015/0294151 A1* | 10/2015 | Kobayashi | ............. G06Q 50/20 |
| | | | 382/103 |

(Continued)

FOREIGN PATENT DOCUMENTS

| | | | | |
|---|---|---|---|---|
| JP | 2009182671 | * | 8/2009 | ............... H04N 1/00 |
| JP | 2011035871 | * | 2/2011 | ............... H04N 1/00 |

(Continued)

OTHER PUBLICATIONS

B. M. Panjaitan, S. A. Rukmono and R. S. Perdana, "Integration Model for Learning Management Systems, Source Control Management, and Autograders using Service-Oriented Architecture Principle," 2021 International Conference on Data and Software Engineering (ICoDSE), 2021, pp. 1-6 (Year: 2021).*

*Primary Examiner* — Beniyam Menberu
(74) *Attorney, Agent, or Firm* — Canon U.S.A., Inc. IP Division

(57) ABSTRACT

A system includes an image processing apparatus configured to perform image reading processing and a management server. The image processing apparatus includes a unit configured to acquire data created by the image reading processing while a user logs in to a registration server communicable with the management server, and a unit configured to transmit the acquired data, wherein the management server includes a unit configured to receive the transmitted data and a unit configured to transmit the received data, and wherein the transmitted data is stored in a storage server communicable with the registration server.

11 Claims, 16 Drawing Sheets

(56) References Cited

U.S. PATENT DOCUMENTS

| | | | | |
|---|---|---|---|---|
| 2016/0006838 A1* | 1/2016 | Makino | ................... | H04L 67/52 |
| | | | | 709/203 |
| 2016/0124690 A1* | 5/2016 | Kimura | ................ | G06F 3/1242 |
| | | | | 358/1.15 |
| 2016/0337553 A1* | 11/2016 | Sato | .......................... | G06F 3/12 |
| 2019/0324900 A1* | 10/2019 | Sakui | ..................... | G06F 21/35 |

FOREIGN PATENT DOCUMENTS

| | | | | |
|---|---|---|---|---|
| JP | 2018191032 | * 11/2018 | ............... | H04N 1/00 |
| JP | 2018195953 | * 12/2018 | ............... | H04N 1/00 |
| JP | 2020112929 | * 7/2020 | ............. | G06F 13/00 |

\* cited by examiner

FIG.10

| ASSIGNMENT ID 1001 | ASSIGNMENT NAME 1002 | CREATOR 1003 | CREATION DATE 1004 | DEADLINE 1005 | ATTACHED FILE 1006 | CREATION SOURCE APPLICATION 1007 |
|---|---|---|---|---|---|---|
| A00001 | ADDITION 1 | ICHIRO SUZUKI | 2020/6/30 | 2020/7/7 | tashi1.pdf | SP0001 |
| A00002 | ADDITION 2 | ICHIRO SUZUKI | 2020/7/2 | 2020/7/9 | tashi2.pdf | SP0001 |
| A00003 | WORD PROBLEM | TARO TAKAHASHI | 2020/7/6 | 2020/7/13 | question.pdf | ID0003 |
| A00004 | SUMMARY OF SUBTRACTION | HANAKO TANAKA | 2020/7/7 | 2020/7/14 | hiki.xlsx | ID0001 |
| A00005 | MULTIPLICATION 1 | TARO TAKAHASHI | 2020/7/8 | 2020/7/15 | kake.docx | ID0003 |

FIG.11

| APPLICATION ID | DESCRIPTION OF APPLICATION | OWNER FLAG |
|---|---|---|
| SP0001 | WEB APPLICATION BY SERVICE PROVIDER | TRUE |
| SP0002 | MOBILE APPLICATION BY SERVICE PROVIDER | TRUE |
| ID0001 | MOBILE APPLICATION CREATED BY A COMPANY | |
| ID0002 | PC APPLICATION CREATED BY B COMPANY | |
| ID0003 | WEB APPLICATION CREATED BY C COMPANY | |

SYSTEM, AND IMAGE PROCESSING APPARATUS

BACKGROUND

Field

The present disclosure relates to a system and an image processing apparatus.

Description of the Related Art

In the field of education, a learning management system (hereinafter, also referred to as "LMS") is used as a learning support system usable on a web. For example, through the use of the LMS, a student creates an answer to an assignment (homework) given by a school teacher online and submits the answer as an item to be submitted.

United States Patent Application Publication No. 2015/0118672 discusses an LMS control method in which a school teacher creates a homework file to issue a homework and copies the homework file so that a student can refer thereto.

SUMMARY

A system includes an image processing apparatus configured to perform image reading processing and a management server, wherein the image processing apparatus includes a unit configured to acquire data created by the image reading processing while a user logs in to a registration server communicable with the management server, and a unit configured to transmit the acquired data, wherein the management server includes a unit configured to receive the transmitted data and a unit configured to transmit the received data, and wherein the transmitted data is stored in a storage server communicable with the registration server.

Further features will become apparent from the following description of exemplary embodiments with reference to the attached drawings.

BRIEF DESCRIPTION OF THE DRAWINGS

FIG. 10 illustrates an example of assignment information held by a database of the LMS server.

FIG. 11 illustrates an example of application information held by the database of the LMS server.

DESCRIPTION OF THE EMBODIMENTS

Figure 1:
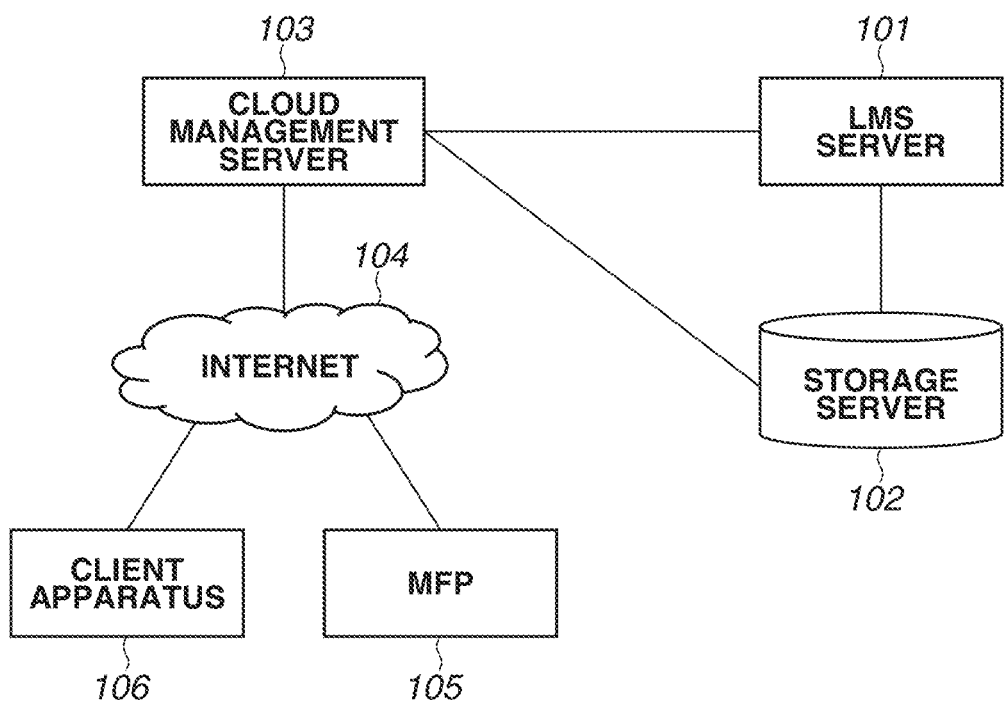
FIG. 1 is a diagram illustrating an example of a configuration of an assignment submission system.

A learning management system (LMS) is desirable to enable a user such as a student to easily submit an answer file of an assignment. An aspect of the present disclosure is directed to a technique facilitating submission of a file.

Some exemplary embodiments of the present disclosure are described in detail below with reference to drawings. The following exemplary embodiments are not intended to limit the scope of the claimed disclosure, and all of combinations of features described in the exemplary embodiments are not necessarily essential for solving means of the present disclosure. The same components are denoted by the same reference numerals, and descriptions of the same components are omitted.

System Configuration

A first exemplary embodiment is described below. FIG. 1 is a diagram illustrating a configuration of a system according to the exemplary embodiment of the present disclosure. In the present exemplary embodiment, a description is given of an example of a system to submit data obtained by scanning (reading) an assignment on a sheet medium through a network using the LMS. In the present exemplary embodiment, the term "assignment" indicates an assignment requiring submission, such as a homework and a report issued in a school. The system according to the present disclosure, however, may be used not only for submission of such an "assignment" but also in submission of a necessary file (data) by a predetermined group.

An LMS service that is a form of a web service is available through the Internet 104. The LMS service is executed by a program executed by an LMS server 101. The LMS server 101 is a registration server including a user account management service and a user authentication service which allows registration of a necessary user to enable the user to use the service. User information registered in the LMS service is stored in the LMS server 101. The LMS service realizes a function in cooperation with a storage service for storing a shared file generated by a class. The system according to the present exemplary embodiment targets teachers and students as users.

The storage service is executed by a program executed by a storage server 102. The storage server 102 stores an assignment file generated in the LMS server 101 by user operation and information on an assignment to be submitted. More specifically, a file generated and registered by a teacher and a file edited by a student are registered in the storage server 102. Examples of a file format storable in the storage server 102 include a document file (Microsoft® Word, portable document file (PDF), etc.), a slide file (Microsoft® PowerPoint®, etc.), an image file, and a text file; however, the file format is not limited.

User authentication for the LMS service and user authentication for the storage service may be collectively managed by the LMS service, or may be individually managed for each service. To obtain sufficient authentication for an individual LMS used by a user and the service function relating to a shared file, an authentication screen is desirably displayed on a display unit of a multi-function printer (MFP) 105 or a display unit of a client apparatus 106.

The client apparatus 106 is an information processing apparatus that can execute applications, such as a smartphone, a tablet, and a typical personal computer (PC). In FIG. 1, only one client apparatus 106 is illustrated; however, a plurality of client apparatus may be provided to be communicable with a cloud management server 103. The user then uses the LMS service by using the own client apparatus 106. In FIG. 1, only one MFP 105 is illustrated; however, a plurality of MFPs 105 may be provided to be communicable with the cloud management server 103. The user then uses the LMS service by using the own MFP 105.

The cloud management server 103 mediates cooperation of the LMS server 101 and the storage server 102 with the MFP 105 and the client apparatus 106 to provide an assignment submission service. The assignment submission service is executed by a program executed by the cloud management server 103. The MFP 105 can communicate with the LMS server 101 and the storage server 102 that are external servers, through the cloud management server 103 without directly communicating with the LMS server 101 and the storage server 102.

The MFP 105 and the client apparatus 106 can communicate with each other by a network established by an access point. Further, the MFP 105 and the client apparatus 106 are connected to the Internet, and can communicate with the cloud management server 103 via the Internet. Each of the MFP 105 and the client apparatus 106 includes a web browser function (web browser application). Using the web browser, each of the MFP 105 and the client apparatus 106 can provide the assignment submission service to the user by displaying a screen of the web service provided by the cloud management server 103.

<Configuration of MFP 105>

Figure 2:
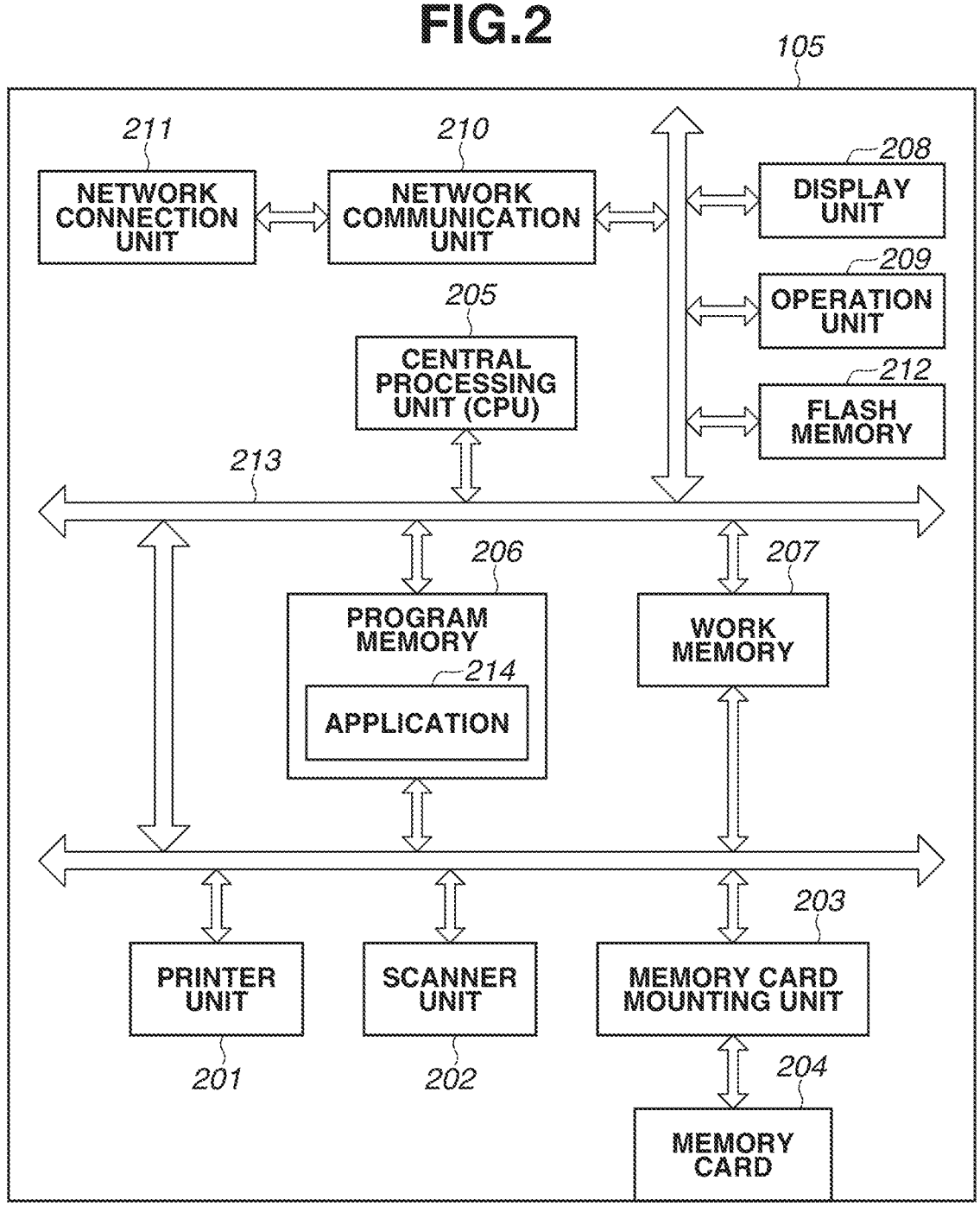
FIG. 2 is a block diagram schematically illustrating a configuration of a multi-function printer (MFP).

FIG. 2 is a block diagram schematically illustrating a configuration of the MFP 105 as an image processing apparatus. In the present exemplary embodiment, an MFP is described as an example of the image processing apparatus; however, the image processing apparatus may be a copier, a facsimile, or the like as long as the image processing apparatus includes a scanner function to read an image (image reading function). In other words, a type of the apparatus is not limited as long as the apparatus can scan a paper medium to generate data.

In the MFP 105, a print function is realized by a printer unit 201, a scanner function is realized by a scanner unit 202, and a storage function is realized by a memory card mounting unit 203 and a memory card 204.

The printer unit 201 prints an image on a print sheet by a recording method such as an inkjet method and an electrophotographic method, based on image data received from an external apparatus or image data stored in the memory card 204. The printer unit 201 also manages ink information including an ink remaining amount and sheet information including the number of loaded sheets.

The scanner unit 202 optically reads an original set on an original platen (not illustrated) and converts the read original into electronic data. In addition, the scanner unit 202 further converts the electric data into image data in a designated file format, and transmits the image data to an external apparatus through the network or stores the image data in a storage area (not illustrated) such as a hard disk drive (HDD). A copy service is realized in such a manner that the scanner unit 202 reads the original placed on the original platen to generate image data and transfers the image data to the printer unit 201, and the printer unit 201 prints the image data on a print sheet.

The memory card 204 mounted on the memory card mounting unit 203 stores various kinds of file data. The file data can be read out from the external apparatus through the network and the file data is editable. Further, the file data can be stored into the memory card 204 from the external apparatus.

The MFP 105 further includes a central processing unit (CPU) 205, a program memory 206, a work memory 207, a display unit 208, an operation unit 209, a network communication unit 210, a network connection unit 211, and a flash memory 212. The CPU 205 controls each of the units inside the MFP 105. The program memory 206 includes a read only memory (ROM) or the like, and stores various kinds of program codes and an application 214 for communication with a server apparatus. The application 214 accesses the printer unit 201 to acquire information on consumables such as ink and sheets. The work memory 207 includes a random access memory (RAM) or the like, and temporarily stores the image data and performs buffering during execution of each service. The display unit 208 includes, for example, a liquid crystal display (LCD), and displays various kinds of information. The operation unit 209 includes switches and the like for the user to perform various kinds of input operation. The network communication unit 210 connects the MFP 105 to the network and performs various kinds of communication. The MFP 105 can be connected to the network such as the Internet via the network connection unit 211. The network communication unit 210 supports a wired local area network (LAN) or a wireless LAN. In a case where the network communication unit 210 supports the wired LAN, the network connection unit 211 serves as a connector to which a wired LAN cable is connected. In a case where the network communication unit 210 supports the wireless LAN, the network connection unit 211 serves as an antenna. The flash memory 212 is a nonvolatile memory storing the image data received by the network communication unit 210, and other data. The above-described units are connected to one another via a bus 213.

<Configuration of Server>

Figure 3:
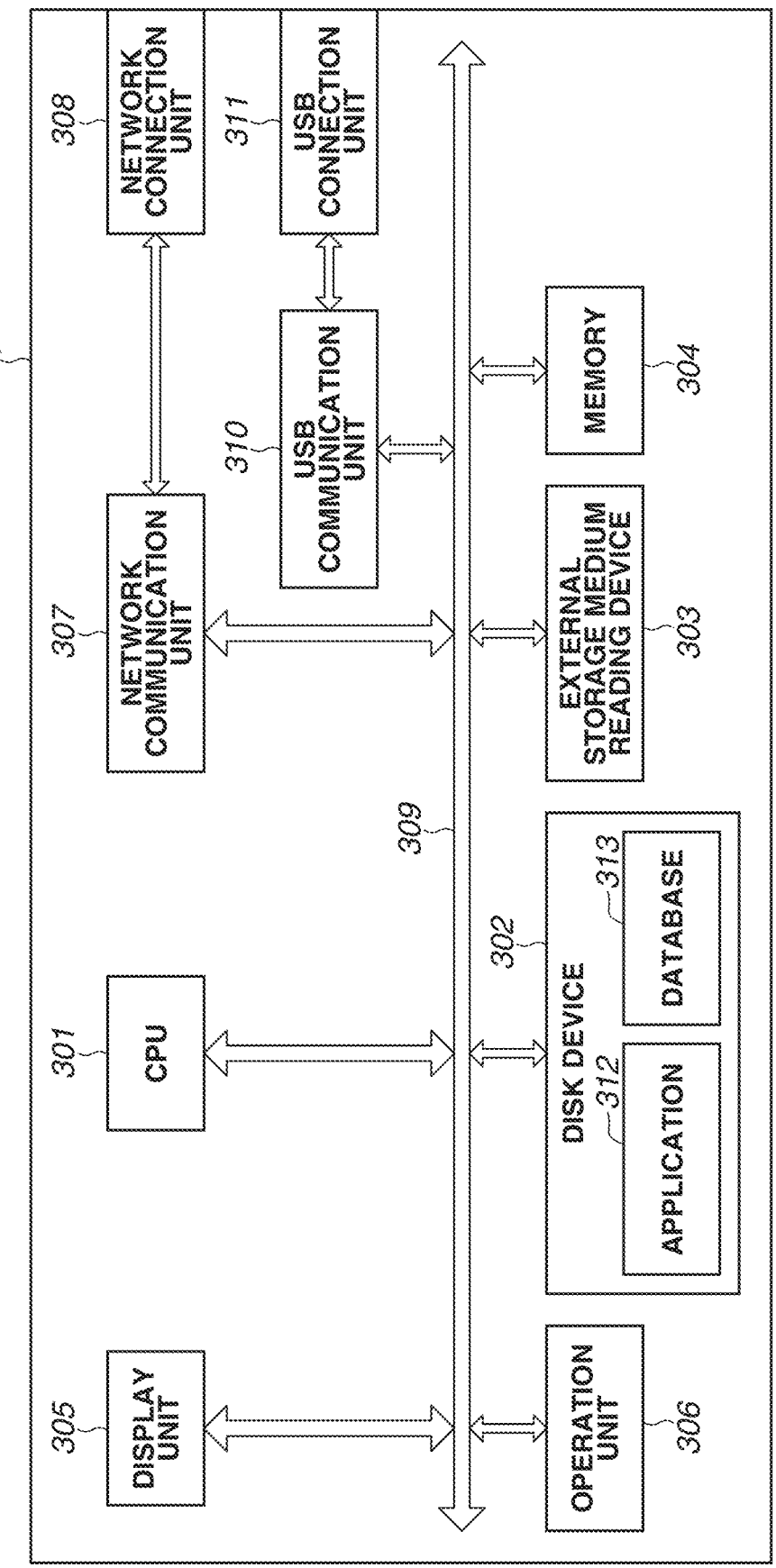
FIG. 3 is a block diagram schematically illustrating a configuration of each of a learning management system (LMS) server and a cloud management server.

FIG. 3 is a block diagram schematically illustrating a configuration of each of the LMS server 101 and the cloud management server 103.

A CPU 301 controls units described below. A disk device 302 stores an application program 312 to be read out by the CPU 301, a database 313, an operating system (OS), and other various kinds of files. An external storage medium reading device 303 is a device reading out information such as a file stored in an external storage medium such as a secure digital (SD) card. A memory 304 includes a RAM or the like. The CPU 301 temporarily stores data in the memory 304, performs buffering of the memory 304, etc., as needed.

A display unit 305 includes, for example, an LCD, and displays various kinds of information. An operation unit 306 includes a keyboard and a mouse for the user to perform various kinds of input operation. A network communication unit 307 is connected to a network such as the Internet via a network connection unit 308, and performs various kinds of communication. The network communication unit 307 supports the wired LAN or the wireless LAN. In a case where the network communication unit 307 supports the wired LAN, the network connection unit 308 serves as a connector to which a wired LAN cable is connected. In a case where the network communication unit 307 supports the wireless LAN, the network connection unit 308 serves as an antenna. A universal serial bus (USB) communication unit 310 is connected to various kinds of peripheral devices via a USB connection unit 311, and performs various kinds of communication. The above-described units are connected to one another via a bus 309.

Each of the client apparatus 106 and the storage server 102 has a configuration similar to the configuration of FIG. 3. Further, in the present exemplary embodiment, a description is given of an example in which each of the LMS server 101, the cloud management server 103, and the storage server 102 includes one server apparatus (information processing apparatus). Each of the services, however, may be configured so as to execute the function when a plurality of servers on the cloud operates in cooperation with one another. In other words, each of the LMS server 101, the cloud management server 103, and the storage server 102 may include a plurality of server apparatuses. A server including one server apparatus or a plurality of server apparatuses is also referred to as a server system.

<Authentication Authorization Processing and Folder Selection Processing>

A description is given below of a sequence of authentication authorization processing of the LMS service performed when the user operates the MFP 105 and processing by the cloud management server 103 to display a folder list screen on the MFP 105 with reference to FIG. 4. The folder list screen is a screen causing the user to select a folder for storing the data scanned and obtained by the MFP 105.

Figure 4:
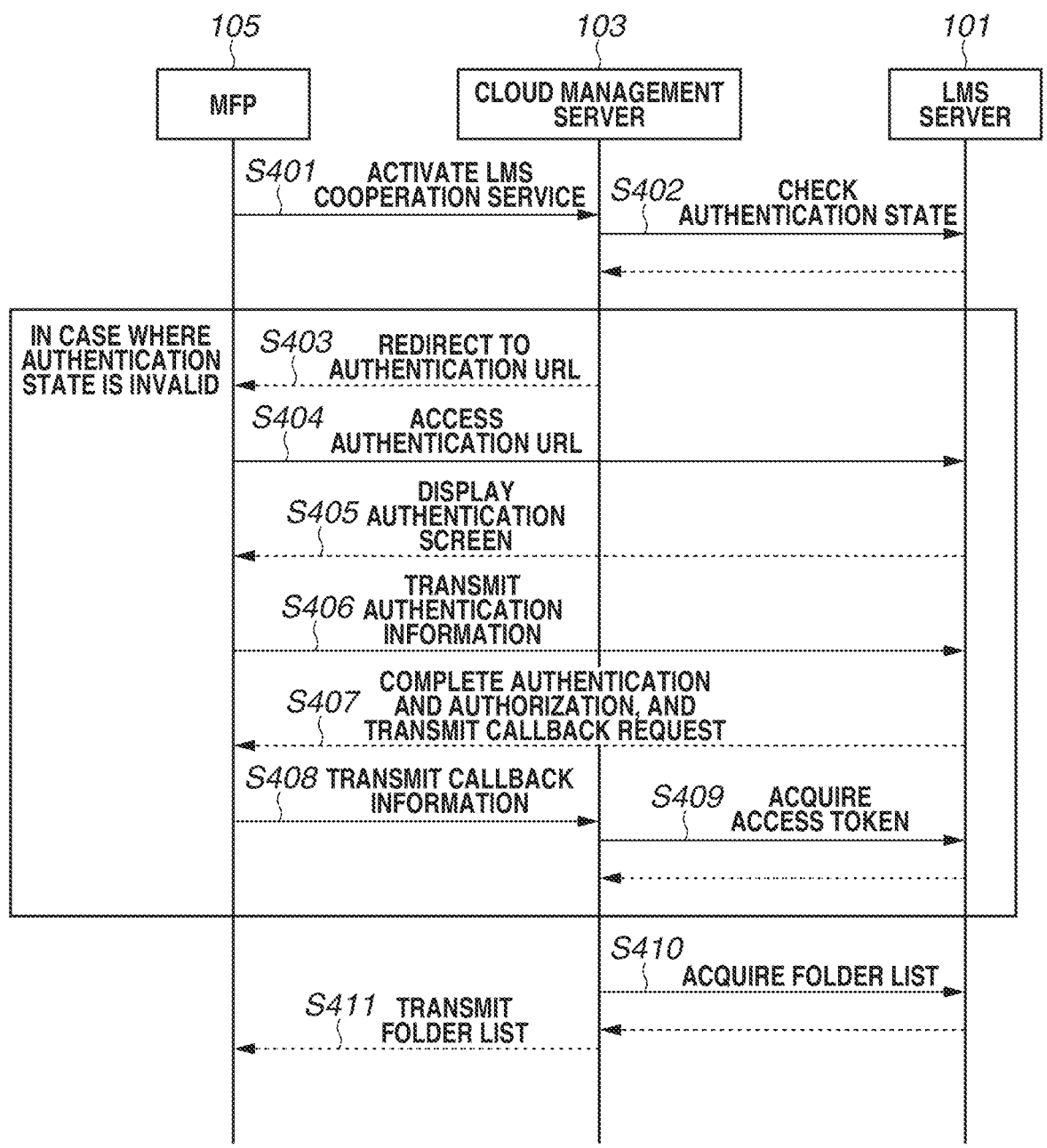
FIG. 4 is a diagram illustrating a sequence to perform user authentication and to acquire data of the LMS server.

In FIG. 4, the web services of both of the LMS server 101 and the cloud management server 103 cooperate with each other to realize an assignment submission function. The LMS server 101 performs authentication of user information. In this example, commonly known OAuth authentication is used. In the OAuth authentication, the cloud management server 103 acts as a client, and the LMS server 101 acts as a resource server. In the following description, each of the apparatuses may be described as a subject of each of the processing; however, the CPU of each of the apparatuses practically executes a program to realize a corresponding function.

First, in step S401, an instruction to activate the LMS cooperation service is issued to the cloud management server 103 based on a user instruction to the operation unit 209 of the MFP 105. The instruction to activate the LMS service can be issued when the user selects any of the options of "creation of assignment", "upload of assignment", and "printing of assignment" after selecting an icon representing the LMS service on the display unit 208 of the MFP 105. In this example, it is assumed that "upload of assignment" is selected.

In step S402, in response to the instruction, the cloud management server 103 instructs the LMS server 101 to check the stored authentication state. More specifically, the cloud management server 103 stores, in a cookie, an access token acquired in step S409 in previous authentication processing. In step S402, the cloud management server 103 determines whether the stored access token is still valid.

In a case where it is determined that the authentication state of the LMS server 101 is invalid, as a result of the authentication processing based on the instruction in step S402, then in step S403, the cloud management server 103 transmits, to the MFP 105, a redirect request to a uniform resource locator (URL) for authentication of the LMS server 101. The case where the authentication state is invalid means a case where the authentication information in the previous authentication is expired or a case where the MFP 105 accesses the LMS server 101 for the first time.

In step S404, the MFP 105 accesses the authentication URL of the LMS server 101 in response to the received redirect request. In step S405, an authentication screen provided by the LMS server 101 is displayed on the display unit 208 of the MFP 105.

In step S406, when the user inputs information (e.g., account identification (ID) and password) for authentication with the LMS server 101 via the authentication screen, the MFP 105 transmits the information to the LMS server 101. The LMS server 101 performs authentication based on the information. At the same time, the LMS server 101 can also perform authorization processing. More specifically, the authorization processing is approval processing to determine whether LMS server 101 provides to the cloud management server 103 information (e.g., folder list) associated with the account authenticated by the authentication processing. In a case where it is determined that the account has not been authorized in the authorization processing, the LMS server 101 causes the MFP 105 to display the screen for authorization (approval) in step S405. When a user instruction representing approval of provision of the information is received via the screen, the information is transmitted to the LMS server 101 in step S406.

In step S407, after the authentication and the authorization (approval) are completed, the LMS server 101 transmits, to the MFP 105, a callback request after completion of the authentication and the authorization.

In step S408, the MFP 105 transmits callback information to the cloud management server 103 in response to the callback request. Here, in a case where the user has not completed the authentication authorization processing for use of the function provided by the LMS server 101 (i.e., LMS server 101 has not authenticated and authorized the user), the processing in steps S405 and S406 is performed again. In other words, the MFP 105 accesses the authentication URL, and displays the authentication screen (login screen) causing the user to input necessary items. The MFP 105 then transmits the authentication information input by the user, to the LMS server 101. In a case where the authentication screen displayed in step S405 is in a format not displayable on the display unit 208 of the MFP 105, the authentication operation in steps S405 to S407 may be performed by another terminal such as the client apparatus 106.

After the authentication and the authorization have been completed successfully, then in step S408, the MFP 105 transmits the callback information to the cloud management server 103. In step S409, the cloud management server 103 issues an acquisition request of an access token that is necessary to acquire a folder list of the authenticated account from the LMS server101, based on the received callback information.

When the cloud management server 103 acquires the access token based on the acquisition request, then in step S410, the cloud management server 103 issues an acquisition request to the LMS server 101 to acquire a folder list in a storage area associated with the authenticated account (login account), by using the acquired access token. In the storage server 102, a storage area is provided for each account, and a folder list is stored in the storage area for each account.

Figure 5:
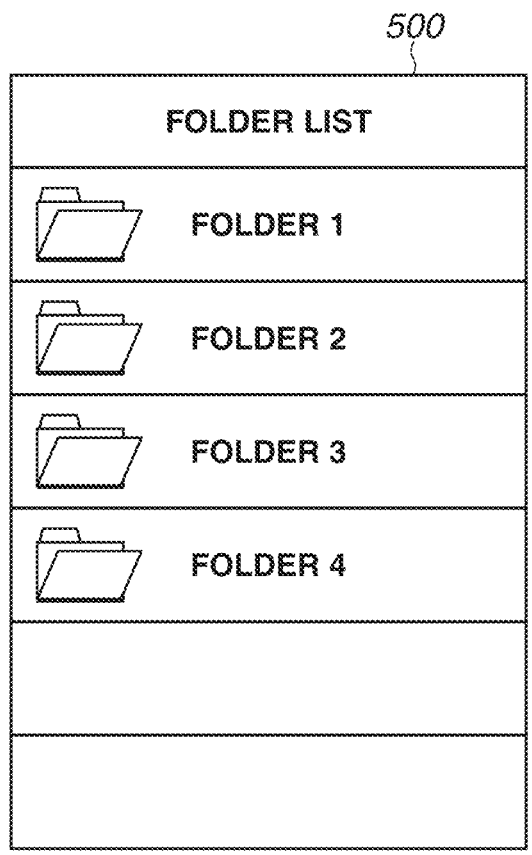
FIG. 5 illustrates an example of a folder display screen.

In step S411, when receiving the folder list, the cloud management server 103 transmits the received folder list to the MFP 105. The MFP 105 generates a folder list screen on the display unit 208 of the MFP 105 based on information in the received folder list. FIG. 5 illustrates an example of the folder list screen.

In FIG. 5, folders 1 to 4 are displayed on a folder list screen 500. The folders are, for example, individual folders provided for respective accounts in the storage server 102. The user selects a folder to which the scan data is to be uploaded on the folder list screen 500 of FIG. 5. The folders in FIG. 5 may be folders set class by class or folders set teacher by teacher. When the user selects a folder to which the scan data of the assignment is to be uploaded from the folder list illustrated in FIG. 5, a screen for scan setting as illustrated in FIG. 6 is displayed.

Figure 6:
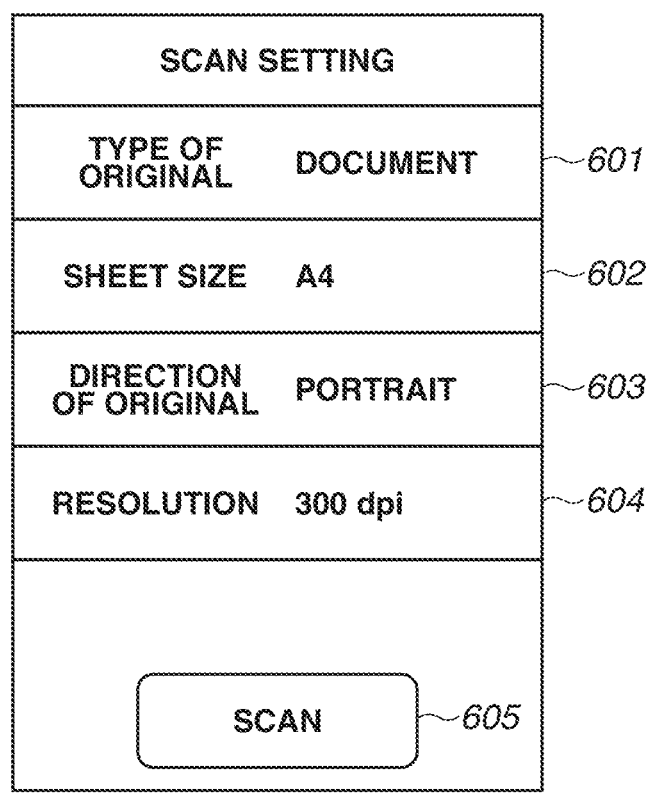
FIG. 6 illustrates an example of a scan setting screen.

In FIG. 6, as settable items, a type of an original (item 601), a sheet size (item 602), a direction of an original (item 603), and resolution (item 604) are displayed; however, the items are not limited thereto as long as the items are settable to the MFP 105. Further, in a case where scanning is performed while setting values of the scanning are fixed, no setting may be made. When the user presses a scan button 605, scan data (file to be submitted) upload processing illustrated in FIG. 7 is performed in a manner described below.

In the above-described example of FIG. 4, the activation instruction in step S401 is issued in response to selection of "upload of assignment" among the options of "creation of assignment", "upload of assignment", and "printing of assignment" displayed after the user selects the icon representing the LMS service. The present exemplary embodiment, however, is not limited thereto. More specifically, the activation instruction in step S401 may be issued in response to selection of the icon representing the LMS service. In this case, the processing up to acquisition of the access token in steps S401 to S409 is performed. Thereafter, the MFP 105 displays a top screen of the LMS service. When the user selects "upload of assignment" among the options of "creation of assignment", "upload of assignment", and "printing of assignment" included in the top screen, the MFP 105 issues the folder list acquisition instruction to the cloud management server 103. In response to the acquisition instruction, the cloud management server 103 performs the processing in step S410. In this case, the folder list is also transmitted from the cloud management server 103 in step S411, so that the MFP 105 can display the folder list screen of FIG. 5.

<Upload Processing>

Figure 7:
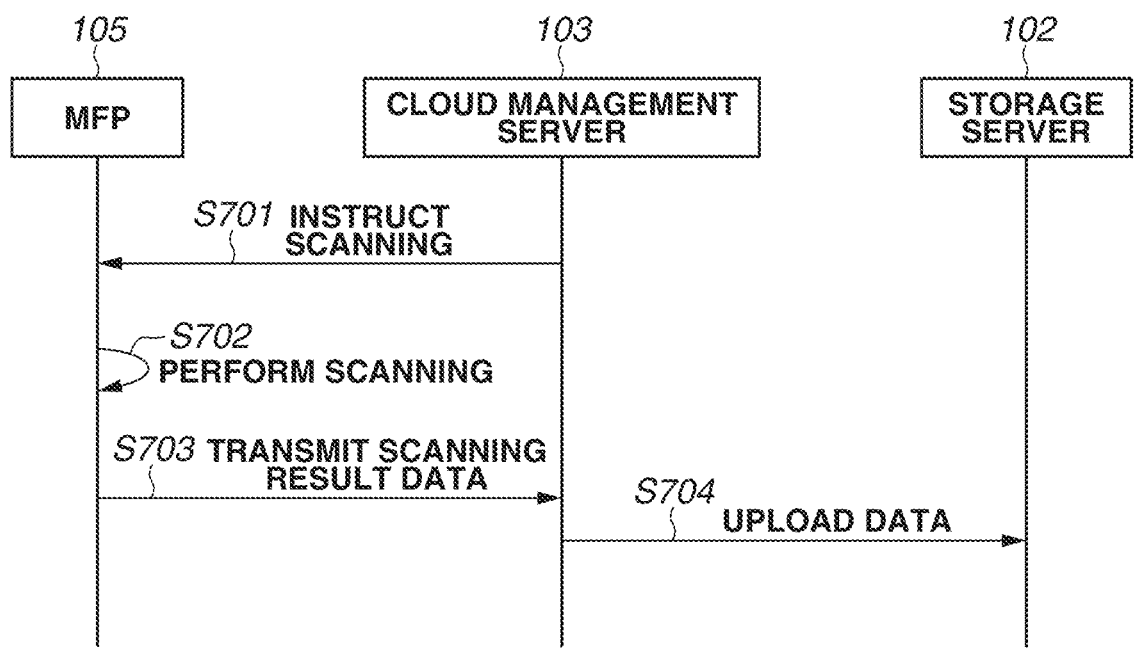
FIG. 7 is a sequence diagram illustrating scan data upload processing.

FIG. 7 is a sequence diagram illustrating processing of scanning an original and uploading data of the scanned original to the storage server 102. In the following description, each of the apparatuses may be described as a subject of each of the processing; however, the CPU of each of the apparatuses practically executes a program to realize a corresponding function.

In step S701, when the scan button 605 of FIG. 6 is pressed, a scan instruction is transmitted from the cloud management server 103 to the MFP 105. At this time, the scan instruction with scan setting parameters set by the user in the scan setting screen of FIG. 6 is transmitted.

In step S702, the MFP 105 having received the scan instruction scans an original (paper of assignment) based on the designated scan setting parameters. As a result, scan data (scan result data) is generated. In step S703, the generated scan data is acquired by the network communication unit 210, and is transmitted to the cloud management server 103.

In step S704, the cloud management server 103 uploads the received scan data to the storage server 102 associated with the account by using the access token acquired in step S409 of FIG. 4. At this time, the cloud management server 103 also transmits folder information on the folder selected by the user in the folder list screen of FIG. 5, and issues an instruction to store the uploaded scan data in the folder selected by the user.

By the above-described processing flow, the user can store the data (file to be submitted) of the assignment scanned by the MFP 105 in the storage server 102 associated with the LMS service used by the user while logging in the LMS service with the user's own account by operating the MFP 105. When the user selects the uploaded assignment data and performs assignment submission operation, the assignment submission processing is then completed. In the present exemplary embodiment, the assignment submission processing may be performed in such a manner that the screen provided by the LMS server 101 is displayed on the information processing apparatus of the user (e.g., client apparatus 106), and the user executes the submission operation via the screen. Alternatively, the screen provided by the LMS server 101 may be displayed on the display unit 208 of the MFP 105, and the user may execute the submission operation via the screen. Furthermore, the submission processing itself may be completed at the completion of the upload process in step S704.

In the above-described example, the user designates the folder in which the scan data is to be stored, in the folder list screen 500 illustrated in FIG. 5; however, the present exemplary embodiment is not limited thereto. The scan data may be stored in a fixed folder, for example, in a root folder (top-level folder) of the storage server 102 associated with the user account. In this case, the scanning may be performed after only the scan setting is performed without displaying the folder list screen 500.

A second exemplary embodiment is described below. In the first exemplary embodiment, the form in which the scan data of the assignment is uploaded to the storage area of the storage server 102 associated with the LMS service used by the user has been described. In the present exemplary embodiment, a description is given of a form in which upload and submission of the assignment are performed on an application provided by the cloud management server 103.

It is expected that a plurality of third-party applications cooperates with the LMS service. The third-party application refers to an application provided by a company (e.g., printer maker C) different from the company providing the LMS service. It is not desirable that an assignment created on such an LMS-service cooperation application provided by the third party is further handled by another LMS-service cooperation application provided by another different third party (e.g., printer maker B) for submission of the assignment, in terms of assignment management by both applications. However, it is desirable that an assignment created on an application provided by not a third party but the LMS service itself can be submitted from any third-party application. The phrase "creating an assignment on an application" used herein means registering an assignment in the LMS service using an application.

In the present exemplary embodiment, a description is given of a method of managing an assignment created on a third-party application cooperating with the LMS service, and a method of selecting the assignment on the application to submit the assignment, to realize the above-described configuration. In the present exemplary embodiment, a cloud management server is provided for each third party. In other words, in the above-described example, the printer maker C provides a cloud management server in which an application for the printer maker C is installed, and the printer maker B provides a cloud management server in which an application for the printer maker B is installed. Each of the cloud management servers can communicate with the LMS server 101 and the storage server 102.

<Assignment Creation (Registration) Processing>

Figure 8:
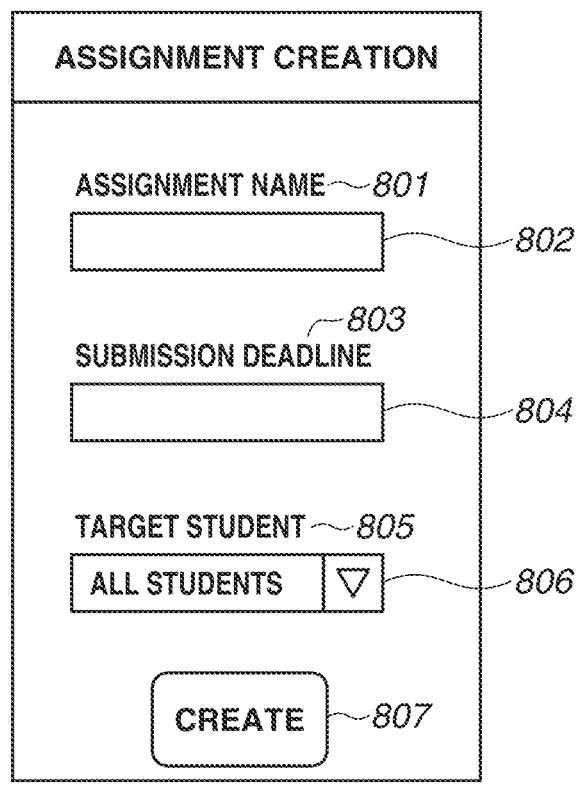
FIG. 8 illustrates an example of an assignment creation screen.

FIG. 8 illustrates an example of an assignment creation screen provided by an application (operating in cloud management server 103) on which creation and submission of an assignment can be performed in cooperation with the LMS service, and the assignment creation screen is displayed on the display unit 208 of the MFP 105. In this example, the application and the cloud management server 103 are provided by the same company, and the LMS service is provided by a different company. In other words, from the viewpoint of the company providing the LMS service, the cloud management server 103 and the application operating in the cloud management server 103 are provided by a third party.

The assignment creation screen of FIG. 8 is displayed in a case where the user selects "creation of assignment" among the options of "creation of assignment", "submission of assignment", and "printing of assignment" after the user selects the icon representing the LMS service on the display unit 208 of the MFP 105. When "creation of assignment" is selected, an instruction to activate the LMS service is issued for authentication authorization processing as in FIG. 4. In this example, however, the processing in steps S410 and S411 is not performed, and the cloud management server 103 causes the MFP 105 to display the assignment creation screen after acquisition of the access token. In step S401 of FIG. 4, alternatively, the activation instruction may be issued in response to selection of the icon representing the LMS service. In this case, the processing up to acquisition of the access token in steps S401 to S409 is performed. Then, in step S409, after the cloud management server 103 acquires the access token, the MFP 105 displays the top screen of the LMS service. Alternatively, the cloud management server 103 may cause the MFP 105 to display the assignment creation screen when the user selects "creation of assignment" among the options of "creation of assignment", "upload of assignment", and "printing of assignment" included in the top screen.

In the assignment creation screen of FIG. 8, for example, a teacher as the user inputs necessary information in items to create (register) an assignment. Thereafter, when the user presses a create button 807, assignment creation processing is started. As the items to create the assignment, an assignment name 801, an assignment submission deadline 803, a target student 805 to which the assignment is given, etc. are considered; however, any items may be displayed as long as the items are settable to the assignment by the cooperating LMS service. As a method of setting each of the items, a text box may be disposed as illustrated as the item 802 and the item 804, and the user may input character strings in the text box by using a keyboard. Further, in a case of the item to set a date such as the submission deadline 803, a calendar may be displayed to designate the date, or a combo box like the item 806 may be displayed to select one of a plurality of items.

In a case where a file is attached to the created assignment, the file in the MFP 105 is selected and attached after the create button 807 is pressed. Alternatively, a list of files stored in the storage area in the storage server 102 associated with the user account may be displayed to cause the user to select a file. Further alternatively, the scan setting screen described in the first exemplary embodiment may be displayed, and the assignment may be scanned and data of the scanned assignment may be attached.

Figure 9:
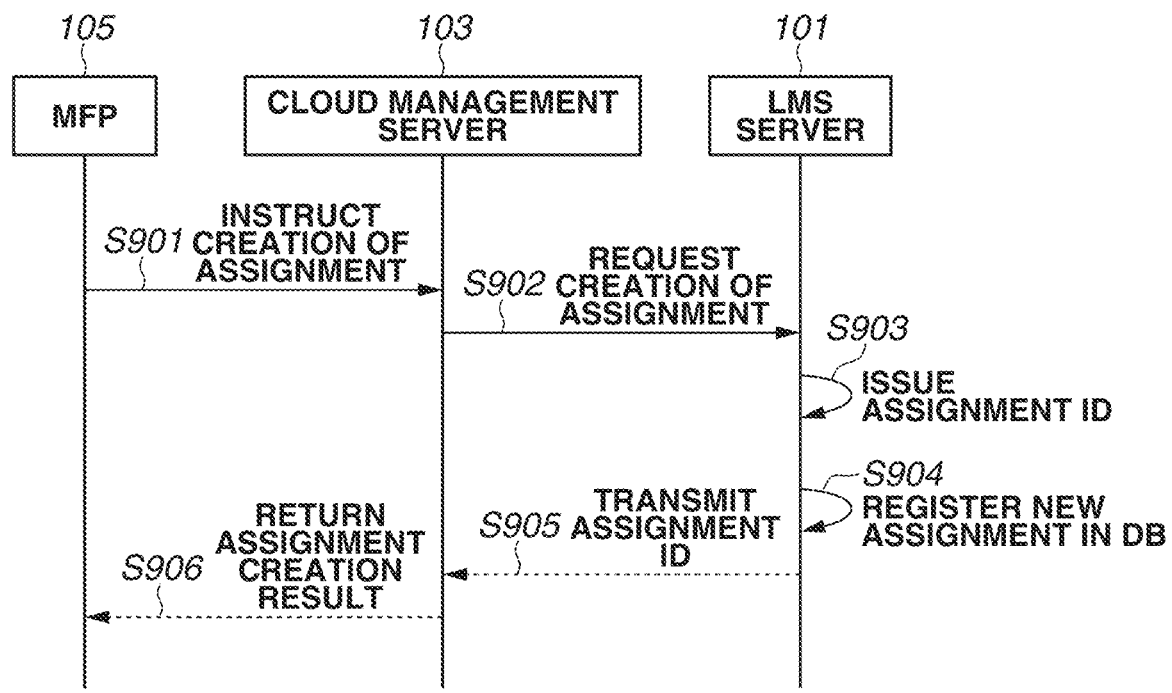
FIG. 9 is a sequence diagram illustrating assignment creation processing.

A sequence to create an assignment after the assignment create button 807 is pressed is described with reference to FIG. 9. FIG. 9 is a sequence diagram illustrating the assignment creation processing. In the following description, each of the apparatuses may be described as a subject of each of the processing; however, the CPU of each of the apparatuses practically executes a program to realize a corresponding function.

In step S901, when the assignment create button 807 is pressed, an assignment creation instruction is transmitted together with the set assignment creation items from the MFP 105 to the cloud management server 103. In step S902, the cloud management server 103 having received the assignment creation instruction transmits an assignment creation request together with the designated assignment creation items to the LMS server 101 by using the access token acquired in step S409 of FIG. 4 described in the first exemplary embodiment.

In step S903, the LMS server 101 issues an ID for management of a new assignment. In step S904, the LMS server 101 creates new assignment data based on the received assignment creation items, and registers the new assignment in the database. FIG. 10 illustrates an example of contents registered in the database.

In the database of FIG. 10, the LMS server 101 manages the assignment ID (1001) issued in step S903 in association with the corresponding assignment creation items. In this example, as the assignment creation items, an assignment name 1002, a creator 1003, a creation date 1004, a deadline 1005, and an attached file 1006 are illustrated; however, any items may be managed in association with the assignment ID as long as the items are settable to the assignment by the LMS service. In addition, in the database, information on a creation source application 1007 representing by which application the assignment has been created is also managed in association with the assignment ID.

As the creation source application information set in the creation source application 1007, an ID (identification information) uniquely set to an application is considered, and a table managing the ID as illustrated in FIG. 11 is recorded in the database. In other words, a description of application 1102 corresponding to an application ID 1101 is managed. Further, information for distinguishing whether the application is an application provided by the LMS service itself or an application provided by a third party different from the company providing the LMS service is stored. More specifically, in a case where the application is not a third-party application but an application provided by the LMS service itself, an owner flag 1103 is set to "TRUE". In a case where the application is a third-party application, the owner flag 1103 of "TRUE" is not added. The owner flag 1103 is information for distinguishing an application provided by the LMS service from a third-party application, and a distinguishing method other than the above may be used. For example, specific character strings may be set to the first two characters of the application ID and managed. The method is not limited as long as it is possible to distinguish whether the application is an application provided by the LMS service itself or a third-party application.

After registration of new assignment is completed in step S904, then in step S905, the LMS server 101 transmits the created assignment ID (group ID) to the cloud management server 103. In step S906, when receiving the assignment ID, the cloud management server 103 returns information representing an assignment creation result to the MFP 105.

At this time, the MFP 105 having received the information representing the assignment creation result may display a message "creation of assignment has been completed" or the like on the display unit 208. In a case where creation of the assignment has failed due to deficiencies in the assignment set items, the MFP 105 may display information on a reason for failure together with a message "creation of assignment has failed", and the screen may be changed to the assignment creation screen again.

<Assignment Submission Processing>

Subsequently, assignment submission processing is described. In the present exemplary embodiment, a description will be given of an example in which submission processing is executed in addition to scanning and uploading of an assignment described in the first exemplary embodiment.

Data to be submitted as an assignment is not limited to the assignment data scanned and uploaded. A file in the MFP 105 may be selected and attached, or a list of files stored in the storage server 102 associated with the user account may be displayed and a file may be selected therefrom.

Figure 12:
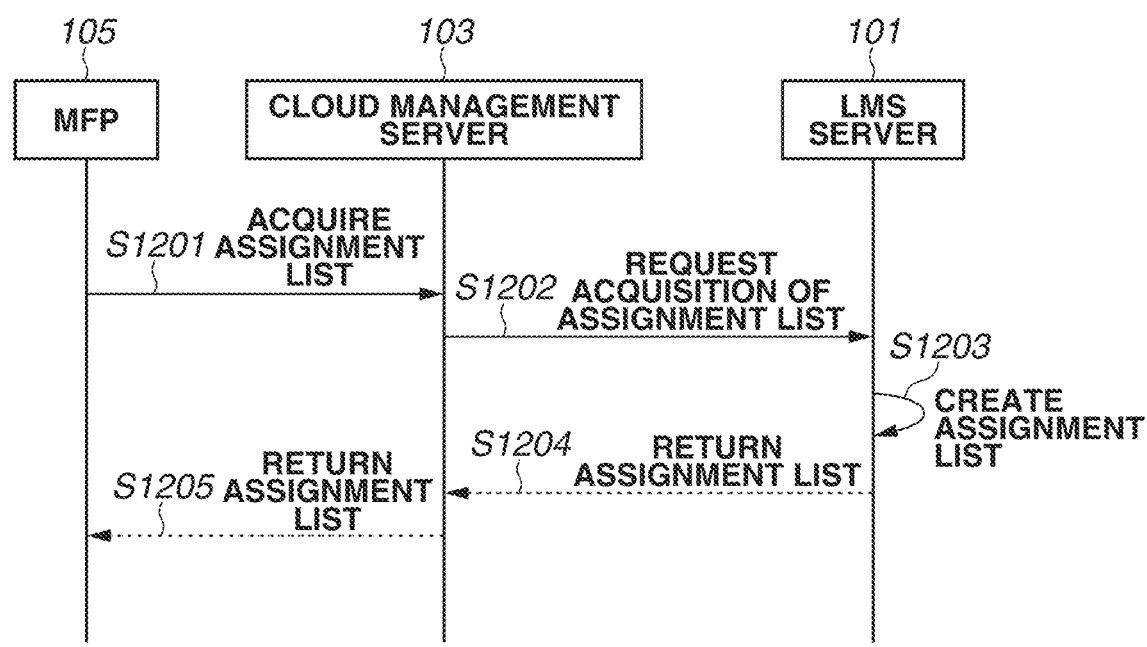
FIG. 12 is a sequence diagram illustrating assignment list acquisition processing.

In the present exemplary embodiment, operation to specify an assignment to be submitted is necessary to submit the assignment. Thus, assignment list acquisition processing is first performed. FIG. 12 is a sequence diagram illustrating the assignment list acquisition processing. In the following description, each of the apparatuses may be described as a subject of each of the processing; however, the CPU of each of the apparatuses practically executes a program to realize a corresponding function. In the cloud management server 103, a third-party application operates. In the LMS server 101, an application provided by the LMS service itself operates.

The sequence of processing in FIG. 12 is performed in a case where the user selects "submission of assignment" among the options of "creation of assignment", "submission of assignment", and "printing of assignment" after the user selects the icon representing the LMS service on the display unit 208 of the MFP 105.

First, in step S1201, an assignment list acquisition request is issued from the MFP 105 to the cloud management server 103. The acquisition request may also serve as the activation request in step S401 of FIG. 4. The authentication processing of FIG. 4 is desirably performed in response to the request. After acquiring the access token in step S409 of FIG. 4, the cloud management server 103 performs processing in step S1202 and subsequent steps in place of the processing in steps S410 and S411. In step S401 of FIG. 4, the activation instruction may be issued in response to selection of the icon representing the LMS service. In this case, the processing up to acquisition of the access token in steps S401 to S409 is performed. After the cloud management server 103 acquires the access token in step S409, the MFP 105 displays the top screen of the LMS service. The processing in step S1201 and subsequent steps may be performed in a case where the user selects "submission of assignment" among the options of "creation of assignment", "upload of assignment", and "printing of assignment" included in the top screen.

In step S1202, the cloud management server 103 transmits the assignment list acquisition request to the LMS server 101 by using the access token acquired in step S409 of FIG. 4.

In step S1203, the LMS server 101 having received the assignment list acquisition request creates a list of assignments submittable by the application in the cloud management server 103 as a request source, by referring to contents of the database illustrated in FIG. 10 and FIG. 11.

More specifically, in the list creation processing in step S1203, a list of assignments associated with the user account is first extracted from the database table of FIG. 10. Thereafter, processing illustrated in a flowchart of FIG. 13 is performed on all of the assignments to determine whether each of the assignments is a submittable assignment.

Figure 13:
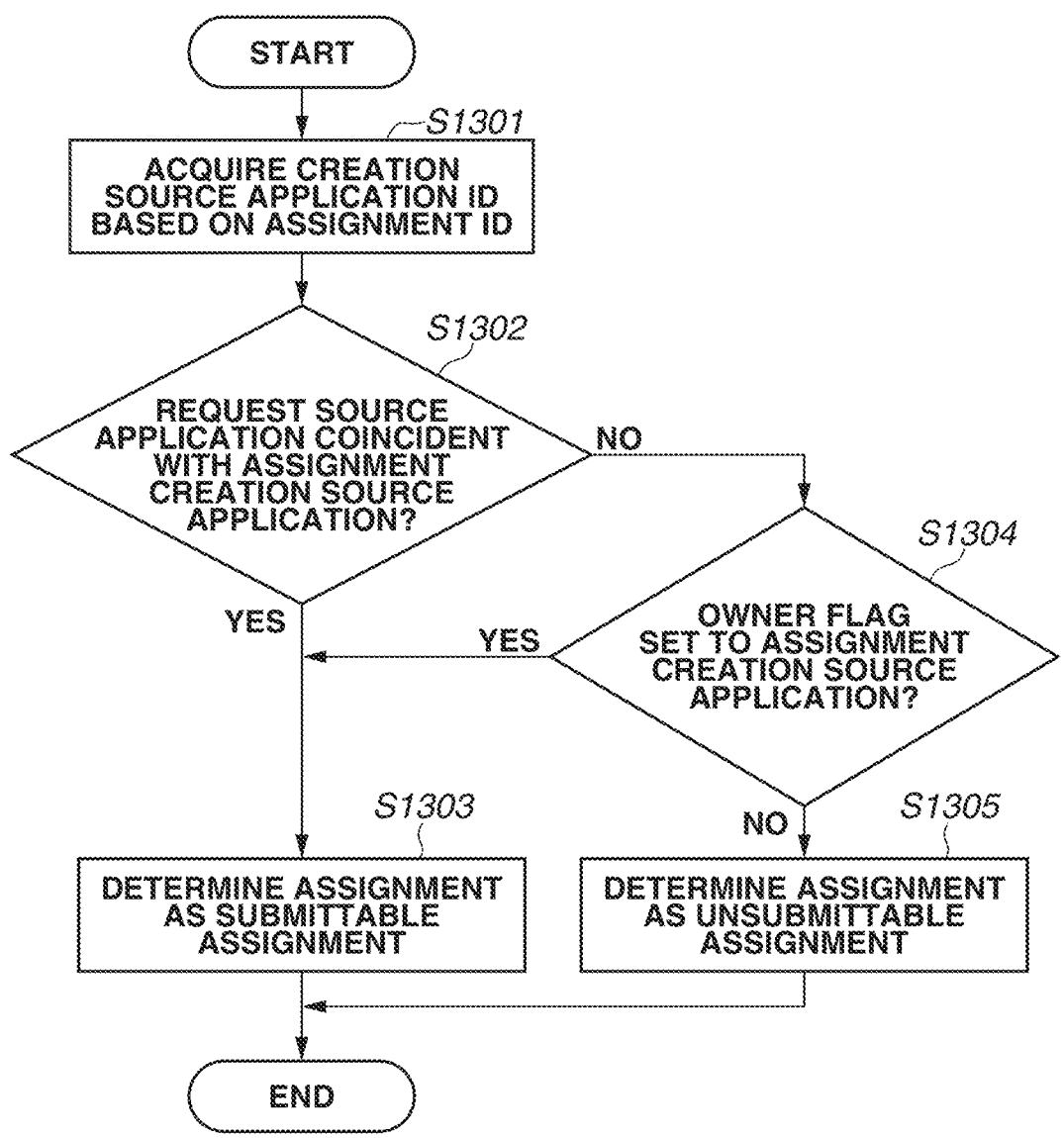
FIG. 13 is a flowchart illustrating a flow of processing to determine a submittable assignment.

In FIG. 13, in step S1301, the LMS server 101 first acquires a creation source application ID based on the assignment ID. In step S1302, the LMS server 101 determines whether the creation source application ID associated with the assignment ID coincides with the application ID of the acquisition request source of the assignment list (application in cloud management server 103 as acquisition request source).

In step S1302, in a case where the request source application ID coincides with the assignment creation source application ID, i.e., in a case where the assignment is an assignment created by the assignment list request source application (YES in step S1302), the processing proceeds to step S1303. In step S1303, the assignment is determined as a submittable assignment. In step S1302, in a case where the request source application ID does not coincide with the assignment creation source application ID, i.e., in a case where the assignment is not an assignment created by the assignment list request source application (NO in step S1302), the processing proceeds to step S1304. In step S1304, it is determined whether the owner flag is set to the assignment creation source application by referring to the contents of the database table of FIG. 11.

In step S1304, in a case where it is determined that the owner flag is set to the assignment creation source application, i.e., in a case where the assignment is an assignment created by the application provided by the LMS service itself (YES in step S1304), the processing proceeds to step S1303. In step S1303, the assignment is determined as a submittable assignment.

In step S1304, in a case where it is determined that the owner flag is not set to the assignment creation source application, i.e., in a case where the assignment is an assignment created by a third-party application other than the application provided by the LMS service itself (NO in step S1304), the processing proceeds to step S1305. In step S1305, the assignment is determined as an unsubmittable assignment.

There is a case where, for example, specific character strings are set to the first two characters of the application ID to distinguish whether the application is an application provided by not a third party but the LMS service itself or a third-party application. In this case, the determination in step S1304 can be performed by using only the information on the creation source application 1007 managed in the database table of FIG. 10 without referring to the database table of FIG. 11.

The assignments extracted and listed can be limited to assignments submittable by the request source application. In a case where an unsubmittable assignment created by a third-party application is also included in the list, the list is created while information representing that the assignment is unsubmittable is added to the assignment.

Further, due to the specification of the LMS service, status information such as "status information indicating assignment to student by teacher", "status information indicating submission to teacher by student", and "status information indicating assignment evaluated by teacher and returned to student" may be added to the assignment. In this case, the returned assignment list may include only the assignment with the "status information indicating assignment to student by teacher", i.e., the assignment to be submitted by the user.

Further, text input by the user may be received on the display unit 208 of the MFP 105 before the assignment list is created, and the assignment list may be created so as to include only the assignment having an assignment name that coincides with the input text, based on information on the text input via the operation unit 209.

After creation of the assignment list is completed in step S1203, then in step S1204, the LMS server 101 returns the assignment list to the cloud management server 103. In step S1205, the cloud management server 103 transmits the assignment list to the MFP 105. An assignment selection screen is displayed on the MFP 105 based on the assignment list.

Figure 14:
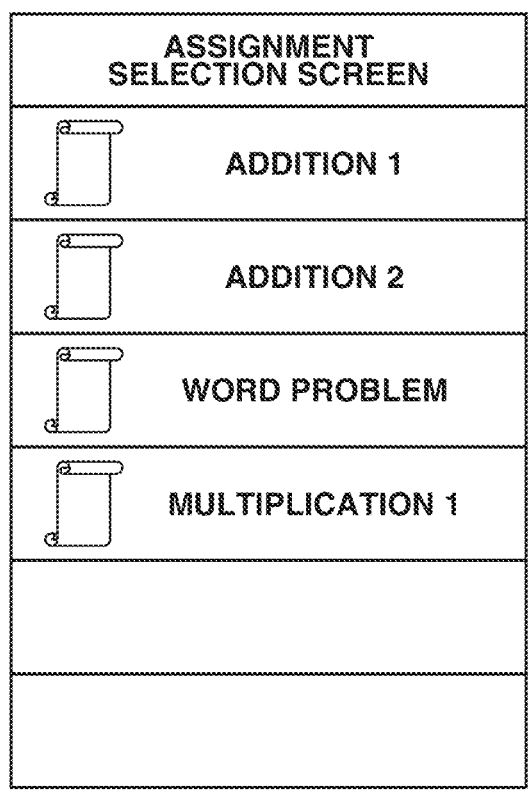
FIG. 14 illustrates an example of an assignment selection screen.
Figure 15:
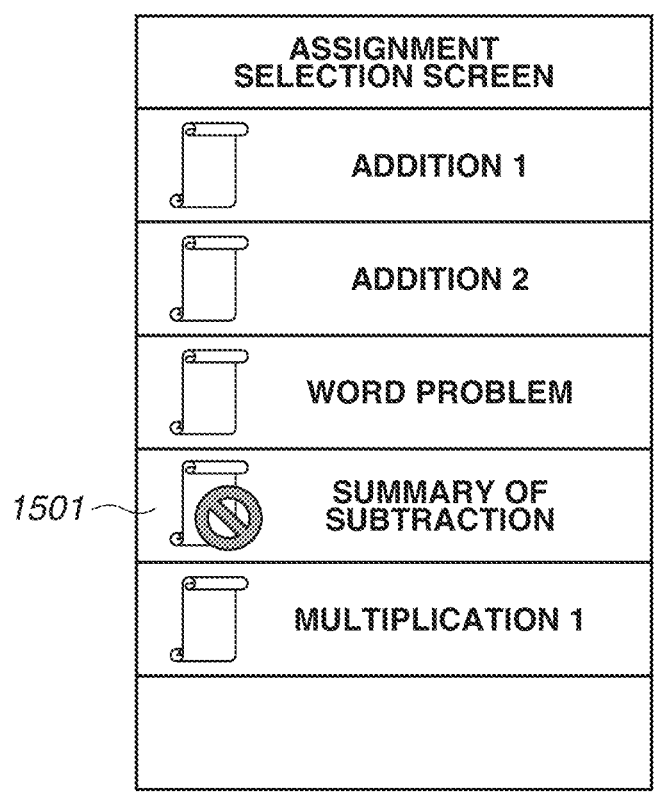
FIG. 15 illustrates another example of the assignment selection screen.

FIG. 14 and FIG. 15 each illustrates an example of the assignment selection screen. The screen illustrated in FIG. 14 is an example of the assignment selection screen in a case where the assignment list transmitted in step S1205 includes only an assignment submittable by the request source application. A list of only submittable assignments is displayed on the display unit 208 of the MFP 105. More specifically, in a case where the request source application is the "web application created by C company" corresponding to ID0003 in the database table illustrated in FIG. 10, the following four assignments are displayed: assignments having assignment IDs "A00001" and "A00002" corresponding to the application ID "SP0001" indicating that the creation source application is an application provided by the LMS service itself; and assignments having assignment IDs "A00003" and "A00005" corresponding to the application ID "ID0003" indicating that the creation source application coincides with the request source application.

The screen illustrated in FIG. 15 is an example of the assignment selection screen in a case where the assignment list returned in step S1205 includes an unsubmittable assignment created by a third-party application. A list of all of the assignments associated with a user is displayed on the display unit 208 of MFP 105. However, since the unsubmittable assignment is transmitted with the information representing that the assignment is unsubmittable, a mark 1501 enabling the user to recognize the assignment as an unsubmittable assignment is added to the unsubmittable assignment. More specifically, in a case where the request source application is the "web application created by C company" corresponding to ID0003 in the database table illustrated in FIG. 10, a list of all of the five assignments is displayed. However, the assignment having an assignment ID "A00004" corresponding to "ID0001" representing that the creation source application is an application (mobile application created by A company) different from the request source application is displayed as an unsubmittable assignment.

In FIG. 15, the special mark 1501 is added in order to enable the user to recognize the assignment as an unsubmittable assignment; however, any method is adopted as long as the assignment can be recognized as an unsubmittable assignment. For example, the item itself may be grayed out so as to be unselectable, or a message notifying that the assignment is unsubmittable may be displayed after selection. Alternatively, a description of the creation source application may be added in order to notify that the assignment has been created by a third-party application.

When the user selects one assignment in the assignment selection screen illustrated in FIG. 14 or FIG. 15, specification of the assignment to be submitted is completed. In other words, an assignment submission destination is selected. Thereafter, assignment upload processing described below is performed.

The assignment upload processing is similar to the processing in which the assignment is scanned and the scanned data of the assignment is uploaded, which is described in the first exemplary embodiment. More specifically, after the user selects one assignment in the assignment selection screen illustrated in FIG. 14 or FIG. 15, the folder list screen illustrated in FIG. 5 is displayed. The user then selects a folder to which the scan data is uploaded from the folder list screen. Alternatively, the screen may be changed to the scan setting screen illustrated in FIG. 6 without displaying the folder list screen, and scanning may be performed.

After execution of scanning is completed, the upload processing to upload the data to the storage area of the storage server 102 associated with the user account is completed as described in step S704 of FIG. 7. In the present exemplary embodiment, after completion of the upload processing, assignment submission processing illustrated in a sequence diagram of FIG. 16 is performed.

Figure 16:
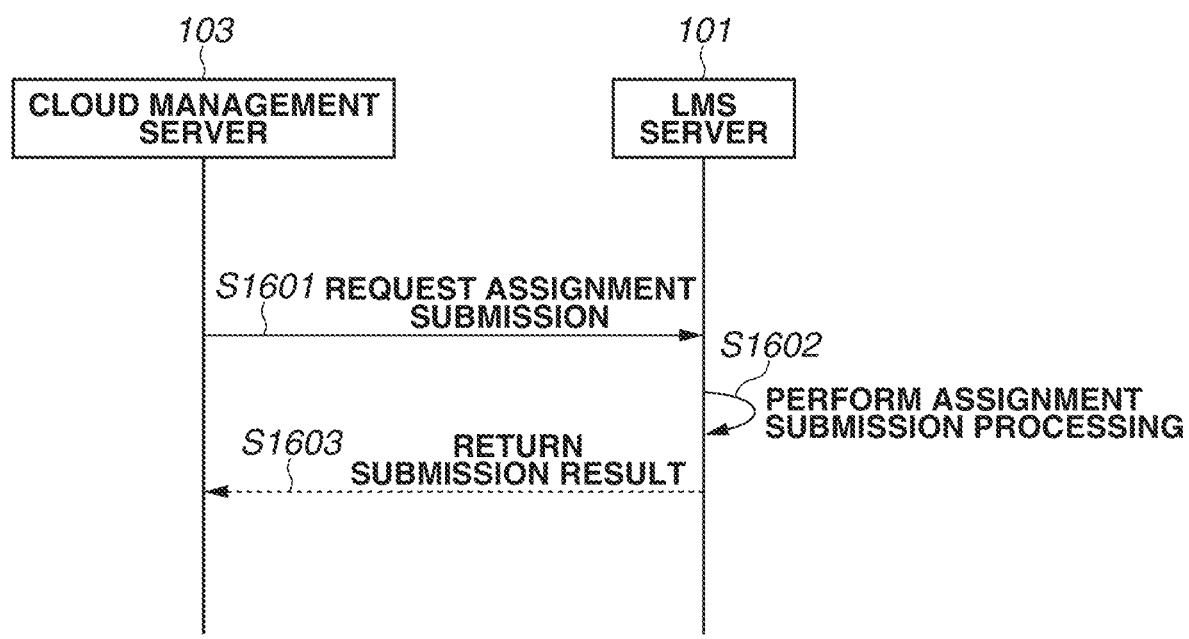
FIG. 16 is a sequence diagram illustrating assignment submission processing.

FIG. 16 is a sequence diagram illustrating the assignment submission processing. In the following description, each of the apparatuses may be described as a subject of each of the processing; however, the CPU of each of the apparatuses practically executes a corresponding program to realize a corresponding function.

In step S1601, the cloud management server 103 transmits an assignment submission request to the LMS server 101 by using the access token acquired in step S409 of FIG. 4. At this time, the cloud management server 103 transmits the request by adding information including the assignment ID of the assignment selected by the user, a file ID for unique identification of the data stored in the storage server 102 by the upload processing in step S704, a URL, and the like to the request. As a result, the cloud management server 103 can request submission of the assignment selected by the user in the assignment selection screen illustrated in FIG. 14 or FIG. 15. In step S1602, the LMS server 101 performs the assignment submission processing in response to the received request. The assignment submission processing by the LMS server 101 indicates changing the status information on the assignment from the "status information indicating assignment to student by teacher" to the "status information indicating submission to teacher by student". By the submission processing, the teacher can access the designated URL, and the scan data can be referred to and edited as an attached file.

In step S1603, the cloud management server 103 acquires information representing an assignment submission result from the LMS server 101. The cloud management server 103, at this time, transmits the result to the MFP 105 based on the information representing the result. The MFP 105 may display a message "submission of assignment has been completed" or the like on the display unit 208 of the MFP 105 based on the received information. In a case where submission of the assignment has failed due to any reason, the MFP 105 may display information on a reason for the failure together with a message "submission of assignment has failed" or the like, and the screen may thereafter be changed to the assignment selection screen again.

In the present exemplary embodiment, the above-described processing allows the user to perform the assignment upload processing from the MFP 105 by operating the MFP 105 while the user is logged in to the LMS service with the own account. In other words, it is possible to store the data of the assignment scanned by the MFP 105, in the storage area of the storage server 102 associated with the LMS service used by the user. Furthermore, in the present exemplary embodiment, the assignment submission processing is performed based on storage of the assignment in the storage server 102. As a result, the status of the assignment can be changed to a submitted state, and the user as the teacher can check the submitted assignment.

A third exemplary embodiment is described below. In the first exemplary embodiment and the second exemplary embodiment, the example in which operation is performed while the screen of the web service of the cloud management server 103 is displayed on the web browser of the MFP 105 has been described. The configuration, however, is not limited thereto. The operation may be performed not on the web browser but on the application 214 built in the program memory 206 of the MFP 105.

Furthermore, a part or all of the processing performed by the MFP 105 in FIGS. 4, 7, 9, and 12 may be performed by an information processing apparatus (client apparatus 106) of the user such as a PC. More specifically, the user uses the client apparatus 106 to log in the service with the user account associated with the MFP 105. As a result, the screen of the web service provided by the cloud management server 103 can be displayed on the web browser of the client apparatus 106. Alternatively, the screen of the web service may be displayed not on the web browser of the client apparatus 106 but on the application program 312. As a result, the client apparatus 106 can perform the processing that is performed by the MFP 105 in response to the user instruction in each of the above-described exemplary embodiments. In this case, the actual scan processing is performed by the MFP 105 in response to an instruction from the client apparatus 106.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, an OS operating in the computer may perform a part or all of the actual processing based on an instruction of a program code read out and executed by the computer. The functions of the above-described exemplary embodiments are realized by the processing.

The exemplary embodiments of the present disclosure make it possible to submit a file more easily.

While the present exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-145987, filed Aug. 31, 2020, which is hereby incorporated by reference herein in its entirety.

What is claimed is:

1. A system, comprising:
an image processing apparatus configured to perform image reading processing; and
a management server,
wherein the image processing apparatus includes at least one processor and at least one memory storing instructions that, when executed by the at least one processor, cause the image processing apparatus to:
acquire data created by the image reading processing while a user logs in to a registration server communicable with the management server,
transmit the acquired data,
request the registration server to register a predetermined assignment, based on an instruction issued via a screen provided by an application,
acquire information on an assignment submittable by the application based on identification information on a service that provides the application, and
display an assignment selection screen based on the information on the assignment submittable by the application, wherein the assignment selection screen is a screen on which only a submittable assignment is displayed among an assignment submittable by the user and an assignment unsubmittable by the user, or a screen on which an assignment unsubmittable by the user is displayed with information indicating that the assignment is unsubmittable attached,
wherein the predetermined assignment is registered in the registration server based on the request,
wherein the management server includes at least one processor and at least one memory storing instructions that, when executed by the at least one processor, cause the management server to:
receive the transmitted data, and
transmit the received data, and
wherein the transmitted data is stored in a storage server communicable with the registration server.

2. The system according to claim 1, wherein the management server requests the registration server to perform submission processing.

3. The system according to claim 2, wherein a status of the data stored in the storage server is changed based on the request of the submission processing.

4. The system according to claim 1,
wherein authentication processing is performed when the user inputs account authentication information via an authentication screen provided by the registration server, and
wherein the user logs in to the registration server when the authentication processing is completed.

5. The system according to claim 1, wherein the management server includes a plurality of information processing apparatuses.

6. A system, comprising:
an information processing apparatus; and
a management server,
wherein the information processing apparatus includes at least one processor and at least one memory storing instructions that, when executed by the at least one processor, cause the information processing apparatus to:
acquire data,
transmit data,
request a registration server to register a predetermined assignment, based on an instruction issued via a screen provided by an application,
acquire information on an assignment submittable by the application based on identification information on a service that provides the application, and
display an assignment selection screen based on the information on the assignment submittable by the application, wherein the assignment selection screen is a screen on which only a submittable assignment is displayed among an assignment submittable by the user and an assignment unsubmittable by the user, or a screen on which an assignment unsubmittable by the user is displayed with information indicating that the assignment is unsubmittable attached,
wherein the predetermined assignment is registered in the registration server based on the request,
wherein the management server includes at least one processor and at least one memory storing instructions that, when executed by the at least one processor, cause the management server to:
receive the transmitted data, and
transmit the received data, and
wherein the transmitted data is stored in a storage server communicable with the registration server.

7. The system according to claim 6, wherein the management server requests the registration server to perform submission processing.

8. The system according to claim 7, wherein a status of the data stored in the storage server is changed based on the request of the submission processing.

9. The system according to claim 6,
wherein authentication processing is performed when a user inputs account authentication information via an authentication screen provided by the registration server, and
wherein the user logs in to the registration server when the authentication processing is completed.

10. The system according to claim 6, wherein the management server includes a plurality of information processing apparatuses.

11. An image processing apparatus communicable with a management server, the image processing apparatus comprising:
at least one processor; and
at least one memory storing instructions that, when executed by the at least one processor, cause the image processing apparatus to:
execute image reading processing based on an instruction from the management server while a user logs in to a registration server communicable with the management server;
generate scan data by the image reading processing;
transmit the generated scan data;
request the registration server to register a predetermined assignment, based on an instruction issued via a screen provided by an application;
acquire information on an assignment submittable by the application based on identification information on a service that provides the application; and
display an assignment selection screen based on the information on the assignment submittable by the application, wherein the assignment selection screen is a screen on which only a submittable assignment is displayed among an assignment submittable by the user and an assignment unsubmittable by the user, or a screen on which an assignment unsubmittable by the user is displayed with information indicating that the assignment is unsubmittable attached,
wherein the predetermined assignment is registered in the registration server based on the request, and
wherein the transmitted data is stored in a storage server communicable with the registration server, via the management server.

* * * * *